(12) United States Patent
Williams et al.

(10) Patent No.: US 8,013,040 B2
(45) Date of Patent: *Sep. 6, 2011

(54) CELLULOSE FIBER-PLASTIC COMPOSITION CONTAINING A LUBRICANT

(75) Inventors: Joseph B. Williams, Williamsport, PA (US); Kenneth S. Geick, Mercerville, NJ (US); Ahmed M. Tafesh, Allentown, PA (US); Xiao Jiang, Flemington, NJ (US)

(73) Assignee: Lonza Inc., Fair Lawn, NJ (US)

( * ) Notice: Subject to any disclaimer, the term of this patent is extended or adjusted under 35 U.S.C. 154(b) by 111 days.

This patent is subject to a terminal disclaimer.

(21) Appl. No.: 10/984,370

(22) Filed: Nov. 8, 2004

(65) Prior Publication Data

US 2006/0100318 A1    May 11, 2006

(51) Int. Cl.
*C08L 97/02* (2006.01)
(52) U.S. Cl. ........................ 524/13; 428/537.1
(58) Field of Classification Search .............. 524/13, 524/14; 604/359; 548/317.1; 52/301
See application file for complete search history.

(56) References Cited

U.S. PATENT DOCUMENTS

| | | | |
|---|---|---|---|
| 3,145,187 A | | 8/1964 | Hankey et al. |
| 3,405,053 A | * | 10/1968 | Broadhead et. al. .......... 527/105 |
| 4,458,042 A | * | 7/1984 | Espy ........................... 524/14 |
| 5,028,675 A | | 7/1991 | Kanda et al. |
| 5,565,576 A | * | 10/1996 | Hall et al. ................. 548/317.1 |
| 6,011,091 A | | 1/2000 | Zehner |
| 6,031,147 A | * | 2/2000 | Gross ........................... 604/359 |
| 6,066,680 A | | 5/2000 | Cope |
| 6,103,791 A | | 8/2000 | Zehner |
| 6,662,515 B2 | * | 12/2003 | Buhrts et al. ................ 52/301 |
| 7,151,125 B2 | * | 12/2006 | Williams et al. ............... 524/13 |
| 2002/0018907 A1 | * | 2/2002 | Zehner ..................... 428/537.1 |

FOREIGN PATENT DOCUMENTS

EP    0 453 010 A    10/1991

OTHER PUBLICATIONS

MacDonald, C., "Wood-Plastic Composites Cross the Threshold From Novelty to Celebrity." Canadian Plastics, Aug. 2004, pp. 15-18, vol. 62, No. 8, Business Information Group, Toronto, Canada.
Sherman, L.M., "Wood-Filled Plastics—They Need the Right Additives for Strength, Good Looks & Long Life." PlasticsTechnology Jul. 2004, pp. 52-59, vol. 50, No. 7, Gardner Publications Inc., New York, USA.
Williams, J.B. et al., "Structure/Performance Characteristics of Bisamide Lubricants in ABS." Presented at the May 1997 Society of Plastics Engineers ANTEC meeting in Toronto, Canada (pp. 1-5).
Williams, J.B. et al., "Effects of Lubricants on Processing of Polymer-Wood Composites." Presented at the May 2002 Society of Plastics Engineers ANTEC meeting in San Francisco, California (pp. 1-5).
International Search Report for PCT/EP2005/011944 published May 11, 2006.

* cited by examiner

*Primary Examiner* — James Seidleck
*Assistant Examiner* — Saira Haider
(74) *Attorney, Agent, or Firm* — Hoffmann & Baron, LLP (57) ABSTRACT

This invention is directed to an extruded product, extrudable compound, and an extrusion method using a polymer, a cellulosic fiber, and at least one lubricant selected from the group consisting of ethoxylated esters of hydantoins, ethoxylated esters of sorbitol or sorbitan, or N, N'-bisalkanoylethylenediamines containing from 8 to 14 carbons of the alkanoyl group and compositions manufactured through such processes which simulate conventional wood products. The N,N'-bisalkanoylethylenediamines are new compositions of matter containing from 8 to 14 carbons of the alkanoyl group having a particle size range from about 90 to 150 μm, preferably from about 120 to 140 μm.

19 Claims, 6 Drawing Sheets

Figure 1
Process Ease

Figure 2
Extruder Zone 3 Temperatures

Figure 3
Process Ease

Figure 4
Extruder Zone 3 Temperatures

**Figure 5
Process Ease**

**Figure 6
Extruder Zone 3 Temperatures**

Figure 7
Process Ease

Figure 8
Process Ease

Figure 9
Process Ease

Figure 10
Extruder Zone 3 Temperatures

Figure 11
Process Ease

Figure 12
Extruder Zone 3 Temperatures

CELLULOSE FIBER-PLASTIC COMPOSITION CONTAINING A LUBRICANT

BACKGROUND OF THE INVENTION

With the rising cost of wood and the shortage of mature trees, there is a present need to find good quality substitutes for wood which will continue long into the future. Additionally, good quality wood substitutes are more durable and longer lasting than wood since they are less susceptible to termite destruction and wood rot.

Over the past several years a growing market has emerged for the use of polymer-wood composites to replace traditional solid wood products in applications such as decking, windows, fencing, automobile interiors and pallets. One key to achieving a high quality polymer-wood composite is a thorough dispersion of cellulosic fiber in a polymer matrix. To achieve this, many leading producers of polyethylene-wood decking have found lubricants to be essential.

Agricultural residues are the parts of the plant that remain in the fields after a crop is harvested. Examples of such residues include, but are not limited to, those parts of the plant left in the fields after the harvesting of straw, oak, rice, and corn. After harvest, the agricultural residues are usually burned or plowed into the ground as compost. In place of burning or plowing these residues into the ground, these annually renewable lignocellosic fibers or lignocellosics have an outstanding potential of being used as a fiber source in the production of a non-wood fiber composites.

U.S. Pat. No. 6,011,091 teaches a cellulosic composite containing from 60 to 70% cellulosic material, from 30 to 40% polyvinyl chloride material and up to 4% by weight of polar thermosetting material. Common commercial lubricants such as calcium esters, e.g., stearate, paraffin wax and amide wax can be used. However, vinyl-chloride based thermoplastics are generally more difficult to process than olefin based thermoplastics.

U.S. Pat. No. 6,066,680 describes an extruded composite formed from foamable plastic containing a polymer resin and wood flour particles. A two step process is taught wherein the wood flour particles are encapsulated by the resin and pelletized, and then the pelletized pieces are mixed with additional resin and blowing agents. Lubricants such as stearic acid, calcium stearate, ester wax, and AC-629A Oxidized Polyethylene wax can be included.

The polymer resins described are polyvinyl chloride, chlorinated polyvinyl chloride and polystyrene.

U.S. Pat. No. 6,103,791, which is a continuation of U.S. Pat. No. 6,011,091 discloses a cellulosic composite containing from 50 to 65% cellulosic material, from 25 to 30% polyvinyl chloride material and up to 4% by weight of polar thermosetting material. These composites are considered to have improved weatherability. Also, they appear to adhere better to the wood material without the need for adhesives or tie layers.

Therefore, a present need exists for a superior polymer-wood composite based on an easily processable polymer which has better weatherability and dimensional stability than contemporary products on the market.

BRIEF SUMMARY OF THE INVENTION

This invention is directed to an extrudable and extruded polymer-cellulosic fiber composition comprising a polymer, e.g., high density polyethylene (HDPE) admixed with cellulosic fiber and at least one lubricant selected from the group consisting of ethoxylated esters of hydantoins, ethoxylated esters of sorbitol or sorbitan, or N, N'-bisalkanoylethylenediamines containing from 8 to 14 carbons of the alkanoyl group. The composition of the invention contains from about 70 to 30 wt. % of cellulosic fiber, based upon the weight of the total composition, and preferably from about 60 to 40 wt. % admixed with about 30 to 70 wt. % polymer, preferably, from about 40 to 60 wt. %. It has now been discovered that these classes of compounds are better lubricants than the current ethylene bisstearamide (EBS)/zinc stearate (ZnSt) blends used in wood. In addition, this invention is for the N, N'-bisalkanoylethylenediamine lubricants wherein each alkanoyl group contains from 8 to 14 carbons, having a particle size range from about 90 to 150 μm, preferably from about 120 to 140μm.

The advantages of these lubricants versus the prior art EBS/ZnSt blends are increased output per percent extruder torque, reduced temperatures in the extruder, improved dimensional stability of extruded profiles, and improved appearance of extruded profiles. The lubricants used in the composition of the invention improve the internal and external lubricity of the plastic blends. The internal lubricity enhances the dispersion of the reinforcing filler in the polymer, thus improving the physical properties and increasing the extruder output. The principal benefit of the external lubricity is to improve the surface appearance of the extruded article by reducing the force needed to move the extrudable composition through the die.

The composition contains from about 1 to 7 wt. % of lubricant based upon the weight of the total composition. Preferred embodiments contain from about 2 to 4 wt. % lubricant for HDPE/pine composites and from about 3 to 6 wt. % lubricant for HDPE/oak composites.

Another embodiment of the invention is a process for the preparation of a polymer-cellulosic composition which includes (a) mixing a polymer, cellulosic fiber, and lubricant to form a mixture, (b) drying the mixture obtained in step (a) for about 10 to 16 hours at a temperature from about 100 °to 120° C. at a pressure of from about 680 to 720 mm Hg to a moisture (water) content of less than 2 wt. % based on the total weight of the composition, (c) extruding the mixture obtained in step (b) at a temperature not more than about 170° C., (d) passing the extruded profile through a cooling chamber containing a plurality of water sprays, and (e) cutting and collecting the extrudate.

Still another embodiment of the invention is a composition prepared by the aforementioned process.

DETAILED DESCRIPTION OF THE INVENTION

The polymers used in the compositions of the invention are virgin polymers which include, but are not limited to, polyolefins and polyvinyl compounds, as for example HDPE, LDPE, LLDPE, UHMWPE, polypropylene (homo- and copolymer), PVC, and combinations thereof. A preferred polyolefin is HDPE, available as a "barefoot" (no additives) reactor powder (Equistar® LB0100-00) having a 0.4 Melt Index (MI). This polyolefin is a product from Equistar® Chemicals LP of Houston, Tex. A wide variety of cellulosic fibers can be employed in the process of the present invention. Illustrative cellulosic fibers include, but are not limited to, wood and wood products, such as wood pulp fibers; non-woody paper-making fibers from cotton, from straws and grasses, such as rice and esparto, from canes and reeds, such as bagasse, from bamboos, from stalks with bast fibers, such as jute, flax, kenaf, cannabis, linen and ramie, and from leaf fibers, such as abaca and sisal. One or more cellulosic fibers may be used. Suitably, the cellulosic fiber used is from a wood source. Suitable wood sources include softwood sources such as pines, spruces, and firs, and hardwood sources such as oaks, maples, eucalyptuses, poplars, beeches, and aspens.

The cellulosic fibers also include agricultural wastes. Examples include, but are not limited to, straw, corn stalks, rice hulls, wheat, oat, barley and oat chaff, coconut shells, peanut shells, walnut shells, jute, hemp, bagasse, bamboo, flax, and kenaff, and combinations thereof.

The cellulosic fibers may be screened through various screens, e.g., a 30-mesh or a 40-mesh screen, to obtain a mixture of different size fibers. The size of the fibers used in the composition of the invention range from about 10 to 100 mesh, and preferably from about 40 to 100 mesh.

The wood flours used in the composition of the invention include soft and hard woods and combinations thereof. Preferable wood flours are oak and pine, available as Oak 4037 (40 mesh) and Pine 402050 (40 mesh) respectively from American Wood Fibers of Schofield, Wis. Another preferred wood flour is maple.

The ethoxylated esters of hydantoin used as lubricants in the invention have the formula:

wherein both $R_1$ may be independently selected from H, $CH_3$ and $C_2H_5$, provided that not more than one $R_1$ may be H; $R_2$ and $R_3$ may be saturated or unsaturated $C_2$ to $C_{22}$ alkyl radicals; and x+y are from 0 to 60. Preferred ethoxylated esters of hydantoins are compounds in which both $R_1$'s are $CH_3$; x+y are from 15 to 40; and $R_2$ and $R_3$ are stearate or oleate radicals.

Sorbitol is a linear $C_6$ sugar alcohol. When sorbitol is ethoxylated and esterified it maintains its linear $C_6$ structure. These ethoxylated esters of sorbitol have the following structure:

where x+y+z+a+b+c=5 to 40

$R_1$, $R_2$, $R_3$, $R_4$, $R_5$ and $R_6$ are independently selected from H or acyl groups. The acyl groups may be derived from saturated or unsaturated alkyl acids having from $C_{12}$ to $C_{22}$.

Sorbitol readily forms esters of tetrahydropyran and tetrahydrofuran. These esters are ethoxylated to form ethoxylated esters of sorbitan. One of the major structures of these esters is shown below:

wherein w+x+y+z may be from 5 to 40 and the R groups are as defined above.

Preferred ethoxylated esters of sorbitan of the present invention are w+x+y+z=20 to 40.

The N, N'-bisalkanoylethylenediamines contain 8 to 14 carbons of the alkanoy group and have the formula:

wherein each —C(═O)R group contains 8 to 14 carbon atoms, and R' is H or $C_1$-$C_8$ alkyl. Preferred N, N'-bisalkanoylethylenediamines N, N'-bisoctanoylethylenediamine, N, N'-bisdecanoylethylenediamine, N, N'-bisdodecanoylethylenediamine, N, N'-bistetradecanoylethylenediamine and combinations thereof Coupling, compatabilizing, or mixing agents may advantageously be present in the polymeric composition. These additives may be present in an amount of from about 0.01 to 20 wt. % based on the total weight of the composition, preferably, about 0.1 to 10 wt. %, and most preferably from about 0.2 to 5 wt. % to achieve improvements in the physical, mechanical and thermal characteristics of the materials. A preferred compatabilizer is maleated polypropylene. Another preferred compatabilizer is maleated HDPE. Talc may be present in an amount from about 2% to 10%, based on the total weight of the composition. Other additives can be used, including viscosity stabilizers, inorganic fillers, processing aids, and coloring agents.

The solid lubricants of the invention are spray-chilled or prilled to form particles having a size range of from about 90 to 150 μm, preferably from about 120 to 140 μm. It has been discovered that these particles have a lower effective melting temperature when admixed with polymer-cellulosic fiber composites and that the composite can be extruded at higher speeds in contrast to composites made with a lubricant having a larger particle size. The use of a solid lubricant within the foregoing particle size range results in a composite with a more uniform extruded profile. In the spray-chilling process, the materials are heated above their melting point and then atomized into a stream of chilled air which causes the atomized droplets to solidify. In the instant invention, the spray-chiller used a 25/30 SS nozzle operated at a temperature of about 160 to 180° C. and a pressure of about 340 to 350 psi. This process resulted in the desired solid lubricant particles which, at a heating rate of about 100° C. per minute, having a melting point of from about 145 to 155° C., preferably, about 150° C.

In addition to extrusion, the compositions of this invention may be injection molded to produce commercially usable products. The resultant product has an appearance similar to wood and may be sawed, sanded, shaped, turned, fastened and/or finished in the same manner as natural wood. It is resistant to rot and decay as well as termite attack and may be used, for example, as decorative moldings inside or outside of a house, picture frames, furniture, porch decks, window moldings, window components, door components, roofing systems and other types of structural members.

The following examples illustrate the invention without limitation. Examples 1 and 2 apply to all cellulosic compositions. All parts and percentages are given by weight unless otherwise indicated.

The Extrusion Process

In all of the examples, the composition materials were mixed in a ten liter Henschel mixer for about three minutes at 1800 rpm. After mixing, the composites were dried for 16 hours at 100° C. in vacuum ovens at about 680 to 720 mm Hg. The dried compositions were extruded through a rectangular profile through a 38.1×12.7 mm die in a 30 mm Werner & Pfleiderer co-rotating twin screw extruder. The extruder set temperature profile from the feed section to the die was 140°, 150°, 150°, 150°, 140° C. The composition material was fed to the extruder using a K-Tron S200 volumetric single screw feeder with a set feed rate ranging from about 10 kg/hr to 20 kg/hr. The screw speed was set at 175 rpm. The extruded profile passed through a 0.65 m cooling chamber containing three sets of water sprays before being cut and collected.

The extruder torque and the extruded output are combined in a "process ease" variable, which is defined as extruded output (lbs/hr) divided by the % torque. The actual temperatures in zone 3 are noted because zone 3 is the area of highest shear in the extruder and temperature increases due to increased shear can cause the actual temperature to be greater then the set temperature.

EXAMPLE 1(a-d)

HDPE-Oak Wood Flour

In examples 1(a-c), the extrudable composition contained 40% HDPE (Petrothene reactor powder (Equistar® LB0100-00)) and 60% Oak 4037 (40 mesh) available from American Wood Fibers of Schofield, Wis.

The control compositions contained lubricants consisting of EBS, ZnSt, and mixtures thereof. Compositions were made using EBS alone, ZnSt alone, a mixture of approximately 1:1 of EBS and ZnSt (designated as "one pack"), and EBS and ZnSt added separately to the composition (designated "mixed separately").

Table 1 show the compositions which are within the scope of the instant invention. Those in Table 2 are for comparative purposes:

TABLE 1

(Compositions of the Invention)

| Lubricant System | Lubricant Compositions |
|---|---|
| A | POE[1] 15 di(2-hydroxyethyl-)5,5 DMH distearate |
| B | POE 15 di(2-hydroxylethyl-)5,5 DMH monooleate |
| C | Mixture of N,N'-bisoctanoylethylenediamine and N,N'-bisdecanoylethylenediamine |
| D | POE 20 sorbitan monostearate |
| E | POE 20 sorbitan monooleate |
| F | POE 5 sorbitan monooleate |
| G | POE 40 sorbitol hexatalate |
| H | POE 40 sorbitol tetraoleate |
| I | POE 20 sorbitol trioleate |
| J | POE 20 sorbitol monolaurate |
| K | N,N'-bisdodecanoylethylenediamine |
| L | Mixture of Lubes M, N, O, and P |
| M | N,N'-bisoctanoylethylenediamine |
| N | N,N'-bisdecanoylethylenediamine |
| O | N,N'-bisdodecanoylethylenediamine |
| P | N,N'-bistetradecanoylethylenediamine |

[1]POE is polyoxyethylene.

TABLE 2

(Comparative Compositions)

| Lubricant System | Lubricant Compositions |
|---|---|
| Control 1 | 50:50 EBS/ZnSt (one pack) |
| Control 2 | 50:50 EBS/ZnSt (mixed separately) |
| Control 3 | 1:2 ESB/ZnSt (one pack) |
| Control 4 | 1:2 EBS/ZnSt (mixed separately) |
| 5 | N,N'-bis(octadecyl-9-ene)ethylenediamine |
| 6 | Stearyl stearate |
| 7 | Distearyl phthalate |
| 8 | Pentaerythritol adipate stearate |
| 9 | Ethylene glycol distearate |
| 10 | Pentaerythritol tetrastearate |
| 11 | Glycerol tristearate |
| 12 | PEG 400 monostearate |
| 13 | Glycerol monooleate |
| 14 | Glycerol dioleate |

EXAMPLE 1(a)

HDPE-Oak Wood Flour

In this example, 5 phc (parts per hundred of composite—HDPE and Oak wood flour) of the control lubricants and the lubricants A-J were added to the extrudable composition.

Figure 1:
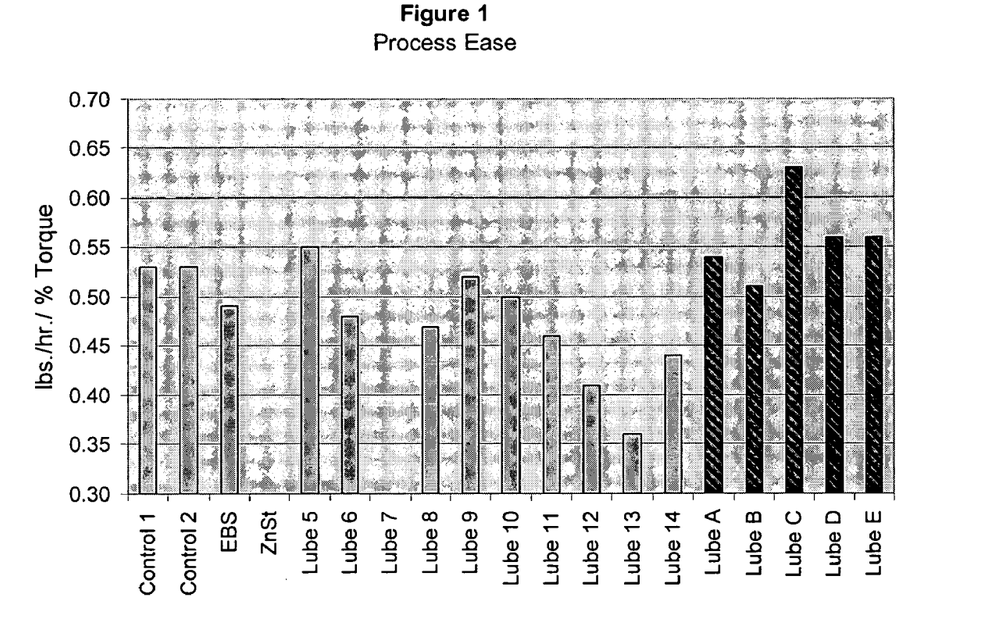
FIG. 1 shows the effect on process ease of compositions containing lubricants in a HDPE/oak flour composite.
Figure 2:
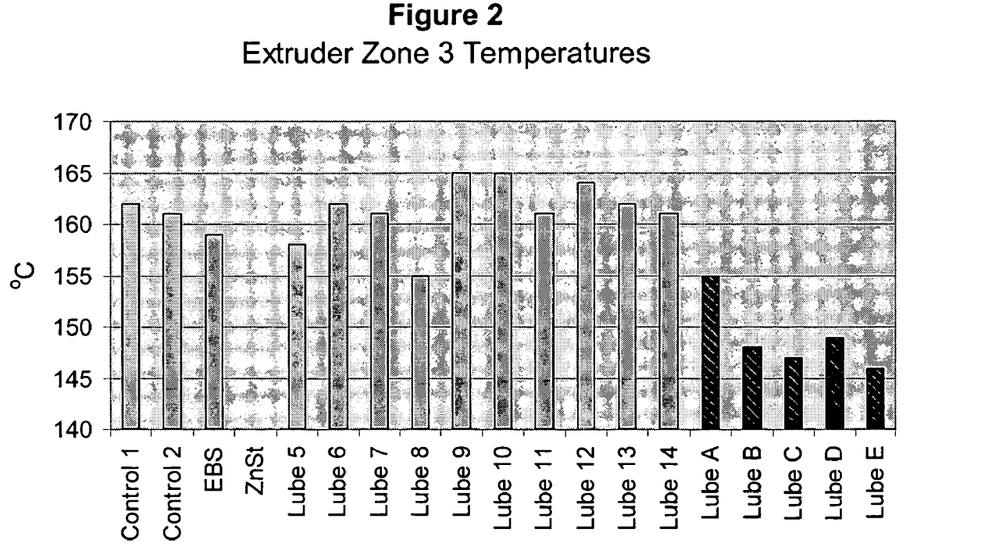
FIG. 2 shows the effect of compositions containing lubricants in a HDPE/oak flour composite on zone 3 temperatures.

The results of screening studies for the different lubricant packages in HDPE/Oak Flour using a feed rate of 11 kg/hr are shown in FIG. 1. The zone 3 temperatures are shown in FIG. 2. The set temperature in zone 3 was 150° C. for all of the runs. No coherent output profiles could be produced using ZnSt or Lube 7.

Lubes A, C, D, and E had process ease values higher than the controls. Lubes A, B, C, D, and E produced better looking profiles than the controls, i.e., they had better surfaces and more uniform dimensions. The process ease value for Lube B was comparable to the process ease values for Comparative Lubes 9 and 10; however, the zone 3 temperature for Lube B was significantly lower than the zone 3 temperatures for Comparative Lubes 9 and 10. The profile containing Lube B had the best appearance.

Comparative Lube 5 had the best process ease of all the comparative lubricants and controls. Lubes C, D, and E had better process ease values than Comparative Lube 5. Although Lubes A and B did not have as good as process ease values as Comparative Lube 5, Lubes A and B had substantially lower zone 3 temperatures than Comparative Lube 5.

As shown in FIG. 2, the indicated zone 3 temperatures for compositions containing most of the comparative lube packages and the controls were 160° C. or higher. Lubes B, C, D and E reduced the measured temperatures in zone 3 more than any of the other lubes studied. Comparative Lube 8 had the same zone 3 temperature as Lube A, but Comparative Lube 8 had a much lower process ease value than Lube A. The zone 3 temperatures measured for Lubes B, C, and E were actually lower than the set temperature.

Figure 3:
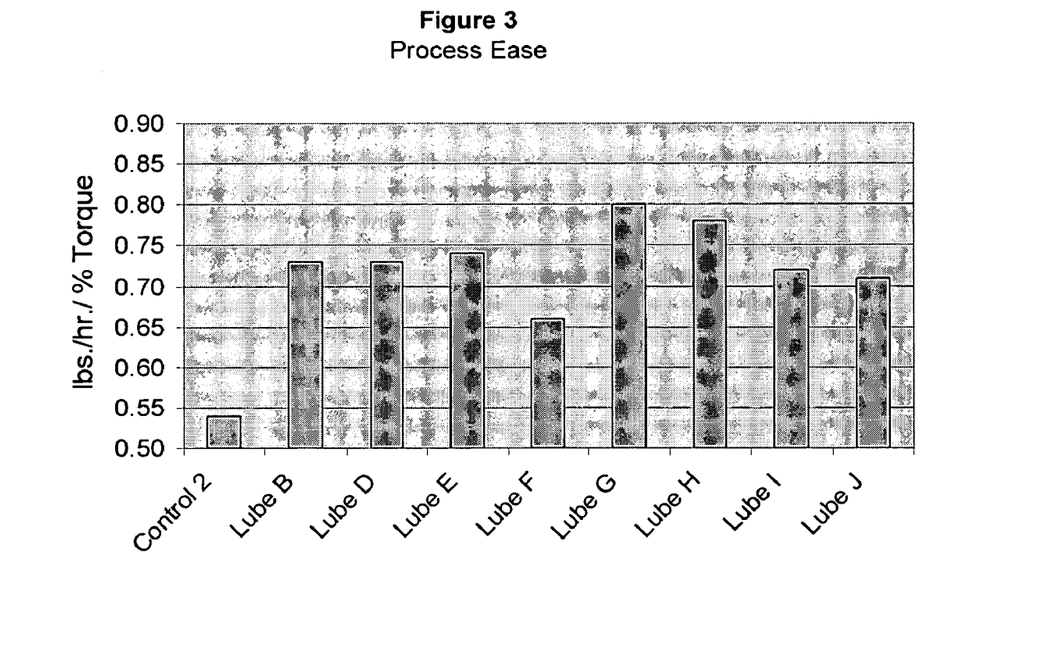
FIG. 3 shows the effect on process ease of compositions containing lubricants B, D, E, F, G, H, I, and J in a HDPE/oak flour composite.
Figure 4:
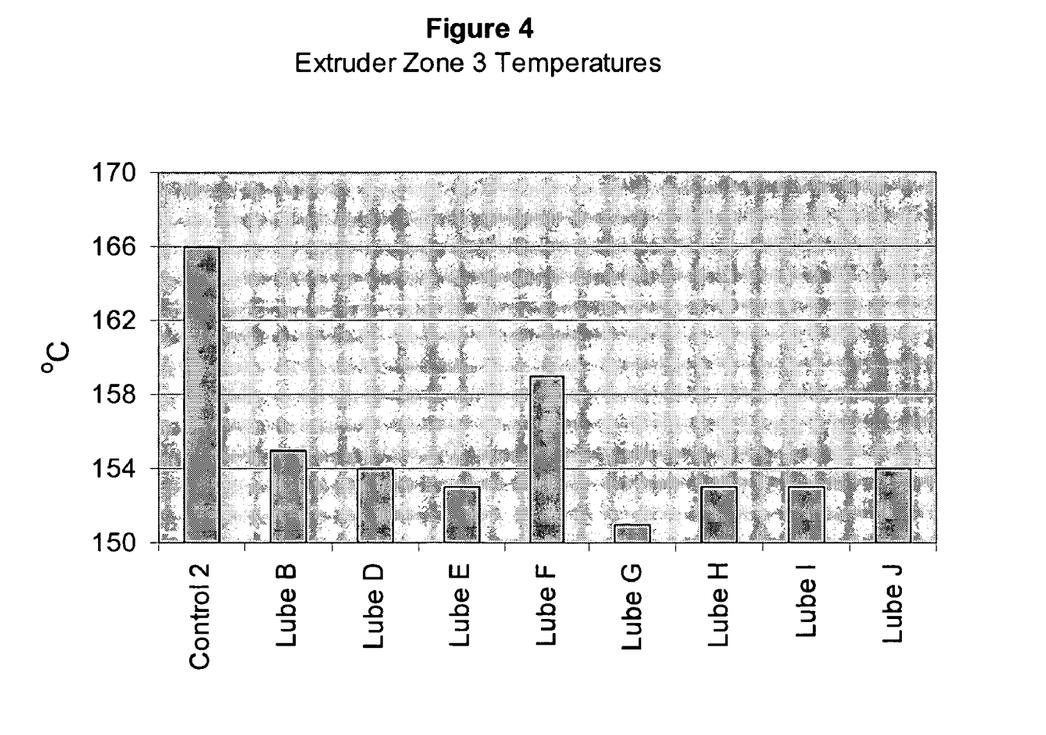
FIG. 4 shows the effect of compositions containing lubricants B, D, E, F, G, H, I, and J in a HDPE/oak flour composite on zone 3 temperatures.

Further runs were made with the lubricants B, D, E, F, G, H, I, and J and HDPE/oak flour mixtures at an extruder feed rate of 18 kg/hr. The process ease results are shown in FIG. 3 and the accompanying zone 3 temperatures are found in FIG. 4. Lubricants B, D, E, F, G, H, I, and J had significantly higher (better) process ease values than Control 2. Lubricants B, D, E, F, G, H, I, and J all had substantially lower zone 3 temperatures than the Control 2. Therefore, at an extruder feed rate of 18 kg/hr, all of the lubricants of the present invention had better process ease and lower zone 3 temperatures than Control 2.

EXAMPLE 1(b)

HDPE-Oak Wood Flour

In this example, various amounts of the Control Lube 2 and lubricants C and K were added to the extrudable composition. The results for these lubricant packages in HDPE/Oak Flour using feed rates between 11 and 18 kg/hr are shown in FIGS. 5 and 6.

Figure 5:
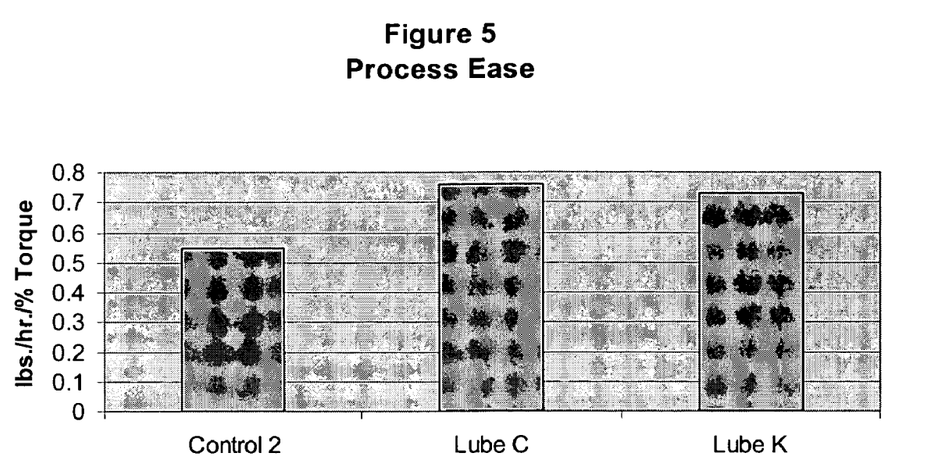
FIG. 5 shows the effect on process ease of compositions containing lubricants C and K in a HDPE/oak flour composite.

The process ease values are shown in FIG. 5. Lubricants C and K had process ease values 38% and 33% greater, respectively, than the EBS/ZnSt control.

Figure 6:
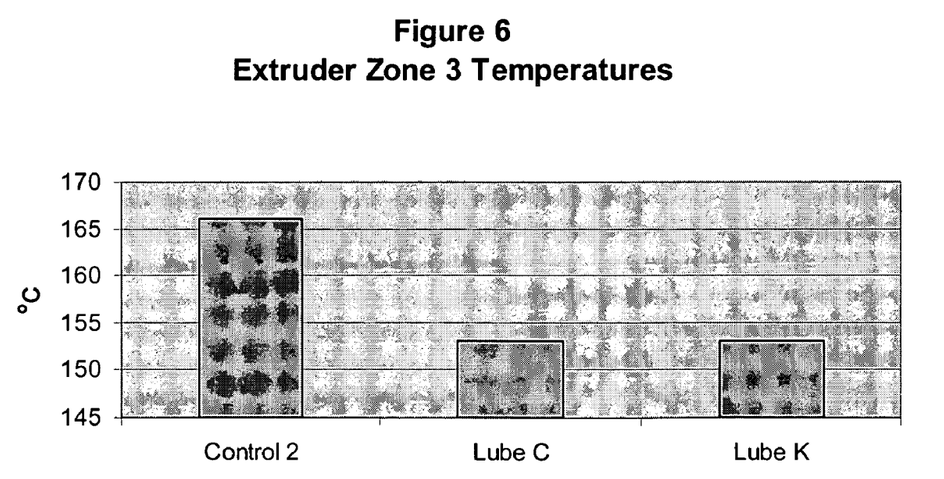
FIG. 6 shows the effect of compositions containing N,N'-bisalkanoylethylenediamine (Lube C(C8/10) and Lube K (C12)) lubricants in a HDPE/oak flour composite on zone 3 temperatures.

The extruder zone 3 temperatures are shown in FIG. 6. Both lubricants C and K resulted in temperatures 13° C. lower than that for the control. This indicates that the composition containing lubricants C and K provide significantly better internal lubrication and hence less shear than with the control lubricant.

EXAMPLE 1(c)

HDPE-Oak Wood Flour

In this example, Lube L was evaluated at various loading levels whereas the EBS/ZnSt control (control 2) was maintained at a constant loading level. Lube L is the reaction product of ethylene diamine and an acid mixture containing 45 to 51% lauric acid, 17 to 20% myristic acid, and 5 to 10% of both caprylic and capric acids.

Figure 7:
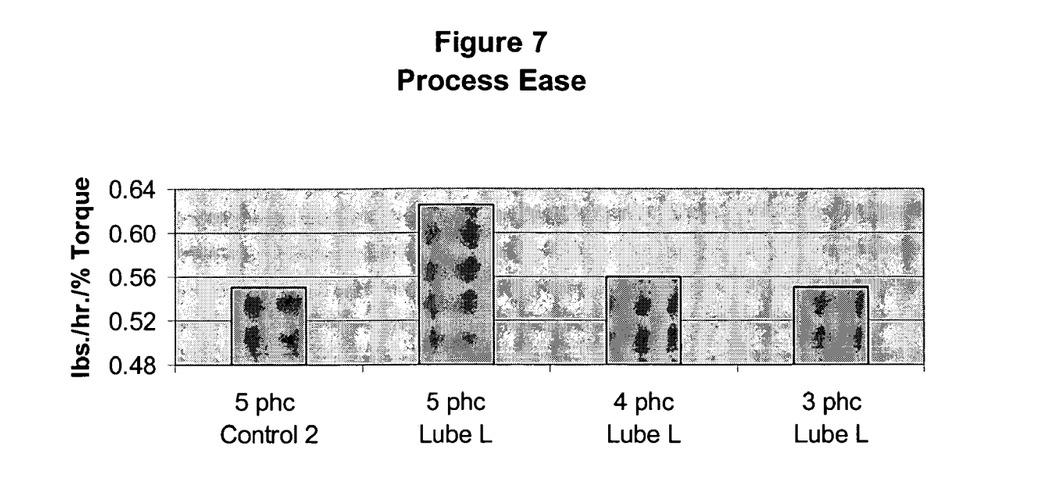
FIG. 7 shows the effect on process ease of compositions containing lubricant L at various loading levels in a HDPE/oak flour composite.

The results in HDPE/Oak Flour at a feed rate of 18 kg/hr are shown in FIG. 7. The control lubricant package consisted of 2.5 phc EBS and 2.5 phc ZnSt (control 2). Lube L was evaluated at 3, 4, and 5 phc. At equal total loadings of lubricant (5 phc), Lube L had almost a 14% increase in the output per % extruder torque. At 4 phc Lube L versus 5 phc of control 2, Lube L resulted in a slightly higher output per % extruder torque. At 3 phc Lube L versus 5 phc control 2 (40% less lubricant), Lube L resulted in equal outputs per % extruder torque.

EXAMPLE 1(d)

HDPE-Oak Wood Flour (and Other Fillers)

Figure 8:
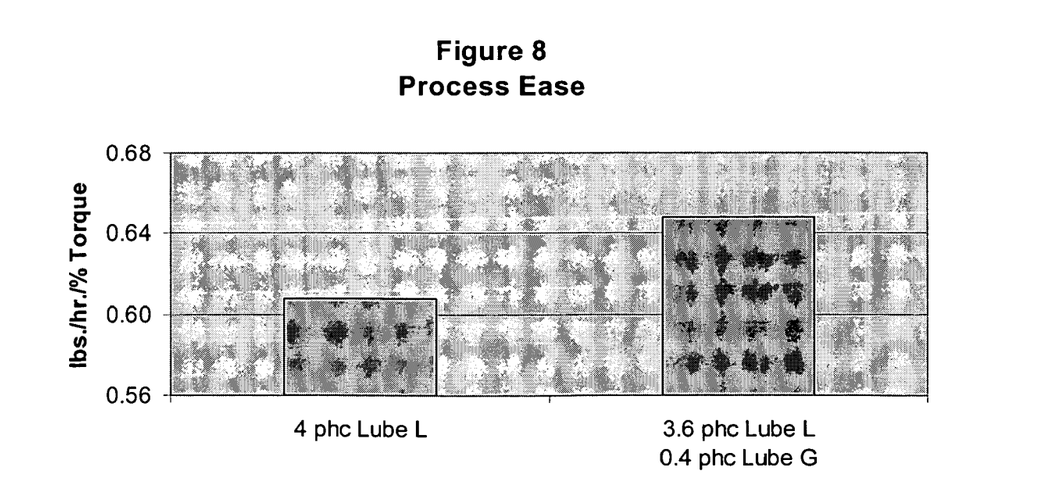
FIG. 8 shows the effect on process ease of compositions containing lubricants L and G in a HDPE/oak flour/filler composite.

In this example, the extrudable composition was a product obtained from TimberTech. It is one of their commercially extrudable products without a lubricant. It is thought to contain a HDPE to oak wood flour ratio of about 45:55 and 5 to 10% talc. Lube L and a mixture of Lube L and Lube G were added to the material at 4 phc and the mixtures were extruded at 14 kg/hr. The ratio of Lube L to Lube G was 9:1. The results are shown in FIG. 8.

The mixture of Lube L and Lube G resulted in a 6.6% higher output than Lube L by itself. In Example 1(c), it is shown that Lube L was a superior lube compared to one of the commercially available lubricant packages used (i.e., EBS plus ZnSt).

EXAMPLE 2

HDPE-Pine Wood Flour

The extrudable composition in this example contained 40% of the same HDPE reactor powder as used in Example 1, 60% Pine 402050 (40 mesh) available from American Wood Fibers of Schofield, Wis., and 6 phc of Polar Minerals 9610 talc, available from Polar Minerals of Mentor, OH. A number of the better lubes in the foregoing HDPE-Oak compositions were evaluated in the HDPE-Pine Flour composite. The extruder speed for these runs was 175 rpm with the feed rate set at 16 kg per hour. The control lubricant packages for these formulations contained 1 phc EBS and 2 phc ZnSt as a one pack system (designated as "Control 3") and as mixed separately (designated as "Control 4").

Figure 9:
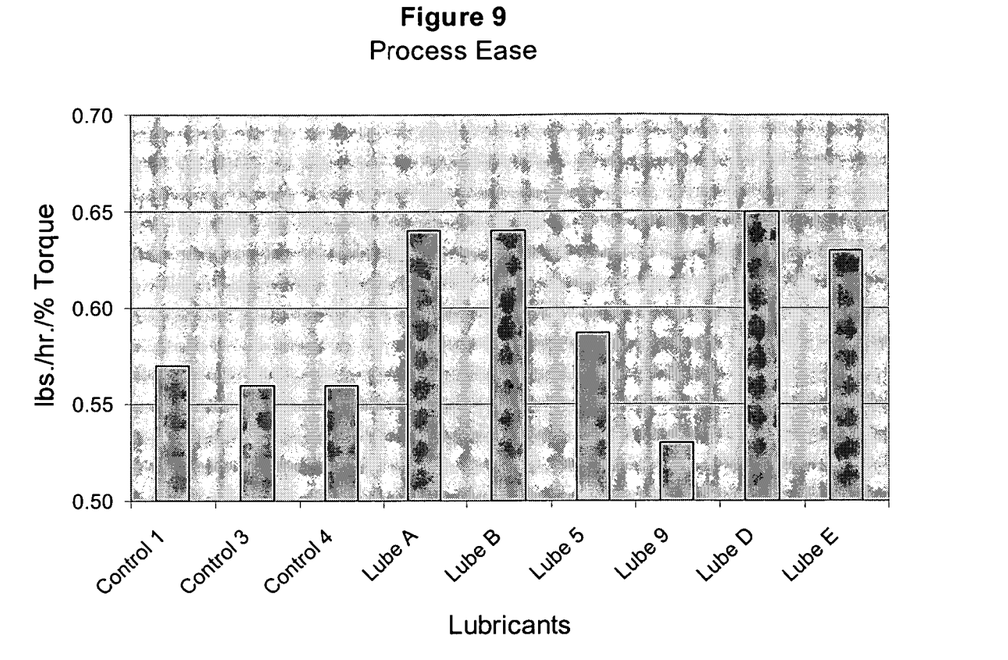
FIG. 9 shows the effect on process ease on compositions containing lubricants A, B, K, O, D, and E in a HDPE/pine flour composite.

The process ease results are shown in FIG. 9. They are similar to those in the HDPE/Oak composites. The one pack lube and the EBS and ZnSt, added separately, had within experimental error, the same process ease values. Lubes A, B, D and E had higher process ease values than the controls and Comparative Lubes 5 and 9. The appearance of the profiles containing the one pack and separately added lubes was identical, while those containing Lubes A, B, D and E had a better appearance than the controls.

Figure 10:
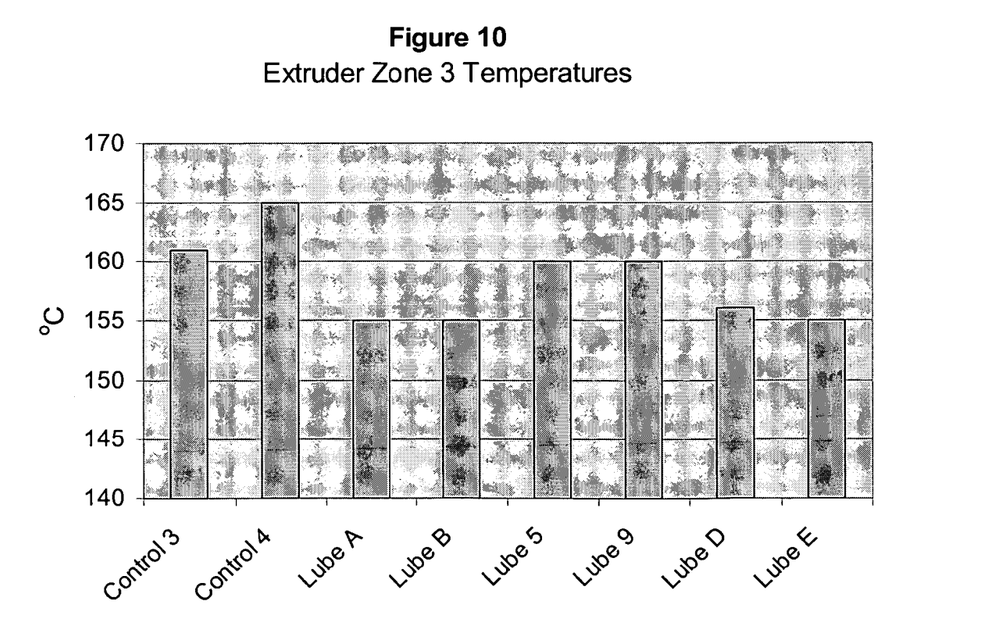
FIG. 10 shows the effect of compositions containing lubricants A, B, K, O, D, and E in a HDPE/pine flour composite on zone 3 temperatures.

The zone 3 temperature results were also similar to those obtained in the HDPE/Oak runs. These are shown in FIG. 10. The zone 3 temperatures for the profiles containing the one pack lube and the lube with the separately added EBS and ZnSt were, within experimental error, the same. However, the zone 3 temperatures for Lubes A, B, D, and E were significantly lower than the controls and Comparative Lubes 5 and 9.

Figure 11:
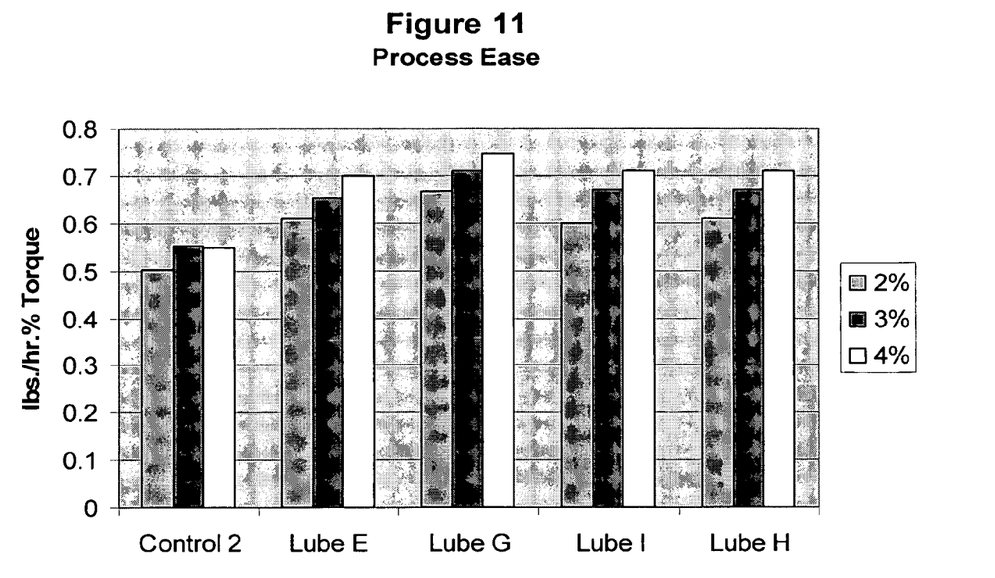
FIG. 11 shows the effect on process ease of compositions containing lubricants E, G, I and H in a HDPE/pine flour composite.

In another series of runs, a control lubricant of EBS and ZnSt in a ratio of 1:2 and lubricant systems E, G, I, and H were added to HDPE/Pine composites and processed at a feed rate of 18 kg/hr. The control lubricant and Lubes E, G, I, and H were tested at concentrations of 2 phc, 3 phc, and 4 phc in HDPE-Pine composites. FIG. 11 shows the effect of lubricant concentration on process ease. The process ease values for Lubes E, G, I, and H were higher at all concentration levels than for the control lubricant. In fact, a 2 phc loading of any of the lubricants of the present invention resulted in a better process ease than the current commercial lubricant at all the additive levels tested. Furthermore, the appearance of the extruded parts was better with the lubricants of the present invention that for those using the control lubricant at any loading concentration.

Figure 12:
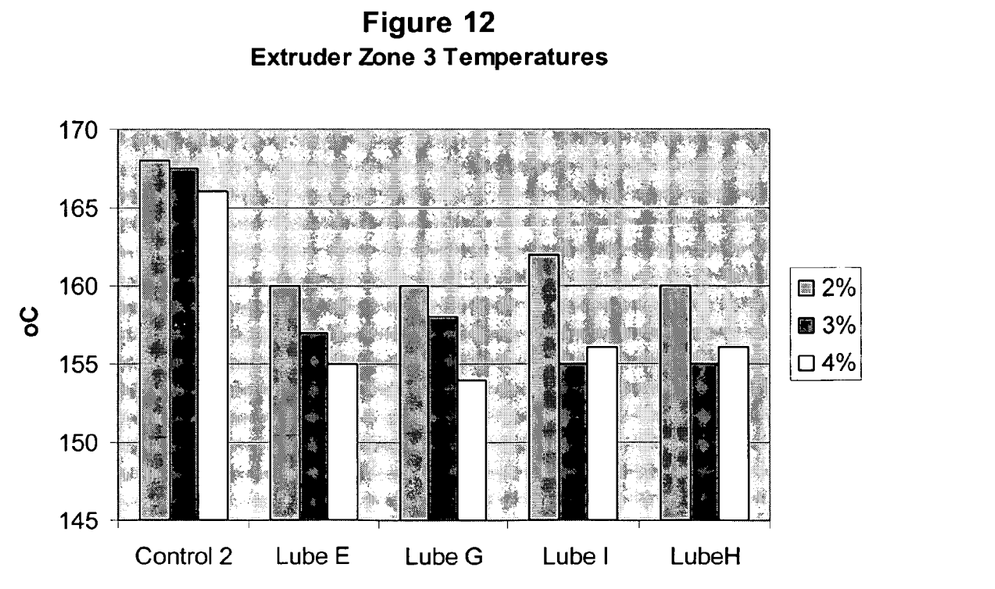
FIG. 12 shows the effect of compositions containing lubricants E, G, I and H in a HDPE/pine flour composite on zone 3 temperatures.

The zone 3 temperatures measured during the above runs are shown in FIG. 12. The zone 3 temperatures are lower at all loadings of the lubricants of the present invention than for the control lubricant at any loading. As with the process ease, the maximum temperature is better (lower) at the lowest loading of the lubricants of the present invention than the control lubricant even at their highest loading.

All patents, applications, articles, publications and test methods mentioned above are hereby incorporated by reference.

Many variations of the present invention will suggest themselves to those skilled in the art in light of the above detailed description. Such obvious variations are within the full intended scope of the appended claims.

What is claimed as new and desired to be protected by Letters Patent of the United States is:

1. A polymer cellulosic fiber composition comprising an admixture of about 30 to 70 wt. % high density polyethylene, about 70 to 30 wt. % oak, and about 2 to 7 wt. % of a lubricant selected from: polyoxyethylene (POE) 15 di(2-hydroxyethyl-)5,5 dimethyl hydrazine (DMH) distearate, POE 15 di(2-hydroxylethyl-)5,5 DMH monooleate, a mixture of N,N'-bisoctanoylethylenediamine and N,N'-bisdecanoylethylenediamine, POE 20 sorbitan monostearate, and POE 20 sorbitan monooleate.

2. The polymer-cellulosic fiber composition of claim 1, wherein the lubricant is a solid having a particle size of about 90 to 150 μm.

3. The polymer-cellulosic fiber composition of claim 1, wherein the effective melting temperature of the lubricant, at a heating rate of about 100° C. per minute during extrusion, is less than about 160° C.

4. The polymer cellulosic fiber composition of claim 1, wherein the composition contains about 60 to 40 wt. % of the oak.

5. The polymer cellulosic fiber composition of claim 1, wherein the composition contains about 3 to 6 wt. % of the lubricant.

6. The polymer cellulosic fiber composition of claim 1, wherein the composition contains about 40 to 60 wt. % of the high density polyethylene.

7. The polymer cellulosic fiber composition of claim 1, further comprising from about 2% to 10 wt. % talc.

8. A polymer cellulosic fiber composition comprising an admixture of about 30 to 70 wt. % of a polymer selected from the group consisting of high density polyethylene, polypropylene and combinations thereof; about 70 to 30 wt. % of cellulosic fiber, wherein the cellulosic fiber is selected from pine, maple, oak, and combinations thereof; and about 2 to 7 wt. % lubricant, wherein the lubricant is mixtures of N,N'-bisoctanoylethylenediamine, N,N'-bisdecanoyl-ethylenediamine, N,N'-bisdodecanoylethylenediamine and N,N'-bistetradecanoylethylene-diamine.

9. The polymer-cellulosic fiber composition of claim 8, wherein the lubricant is a solid having a particle size of about 90 to 150 μm.

10. The polymer-cellulosic fiber composition of claim 8, wherein the effective melting temperature of the lubricant, at a heating rate of about 100° C. per minute during extrusion, is less than about 160° C.

11. The polymer cellulosic fiber composition of claim 8, wherein the composition contains about 60 to 40 wt. % of the cellulosic fiber.

12. The polymer cellulosic fiber composition of claim 8, wherein the composition contains about 40 to 60 wt. % of the polymer.

13. The polymer cellulosic fiber composition of claim 8, further comprising from about 2% to 10 wt.% talc.

14. A polymer cellulosic fiber composition comprising an admixture of about 30 to 70 wt. % high density polyethylene, about 70 to 30 wt. % pine, and about 2 to 7 wt. % lubricant, wherein the lubricant is selected from polyoxyethylene (POE) 15 di(2-hydroxyethyl-)5,5 dimethyl hydrazine (DMH) distearate, POE 15 di(2-hydroxylethyl-)5,5 DMH monooleate, POE 20 sorbitan monostearate, POE 20 sorbitan monooleate, POE 40 sorbitol hexatalate; POE 40 sorbitol tetraoleate; POE 20 sorbitol trioleate; and mixtures of N,N'-bisoctanoylethylenediamine, N,N'-bisdecanoyl-ethylenediamine, N,N'-bisdodecanoylethylenediamine and N,N'-bistetradecanoylethylene-diamine.

15. The polymer-cellulosic fiber composition of claim 14, wherein the lubricant is a solid having a particle size of about 90 to 150 μm.

16. The polymer-cellulosic fiber composition of claim 14, wherein the effective melting temperature of the lubricant, at a heating rate of about 100° C. per minute during extrusion, is less than about 160° C.

17. The polymer cellulosic fiber composition of claim 14, wherein the composition contains about 60 to 40 wt. % of the pine.

18. The polymer cellulosic fiber composition of claim 14, wherein the composition contains about 40 to 60 wt. % of the high density polyethylene.

19. The polymer cellulosic fiber composition of claim 14, further comprising from about 2% to 10 wt. % talc.

* * * * *